Oct. 8, 1940. J. DE LA CIERVA 2,216,768
AIRCRAFT WITH AUTOROTATIVE SUSTAINING ROTORS
Original Filed April 29, 1937 14 Sheets-Sheet 2

Oct. 8, 1940.　　　J. DE LA CIERVA　　　2,216,768
AIRCRAFT WITH AUTOROTATIVE SUSTAINING ROTORS
Original Filed April 29, 1937　　14 Sheets-Sheet 6

INVENTOR
Juan de la Cierva, deceased,
BY John Josselyn
R. Blake } ADMINISTRATORS
BY Synnestvedt & Lechner
ATTORNEYS

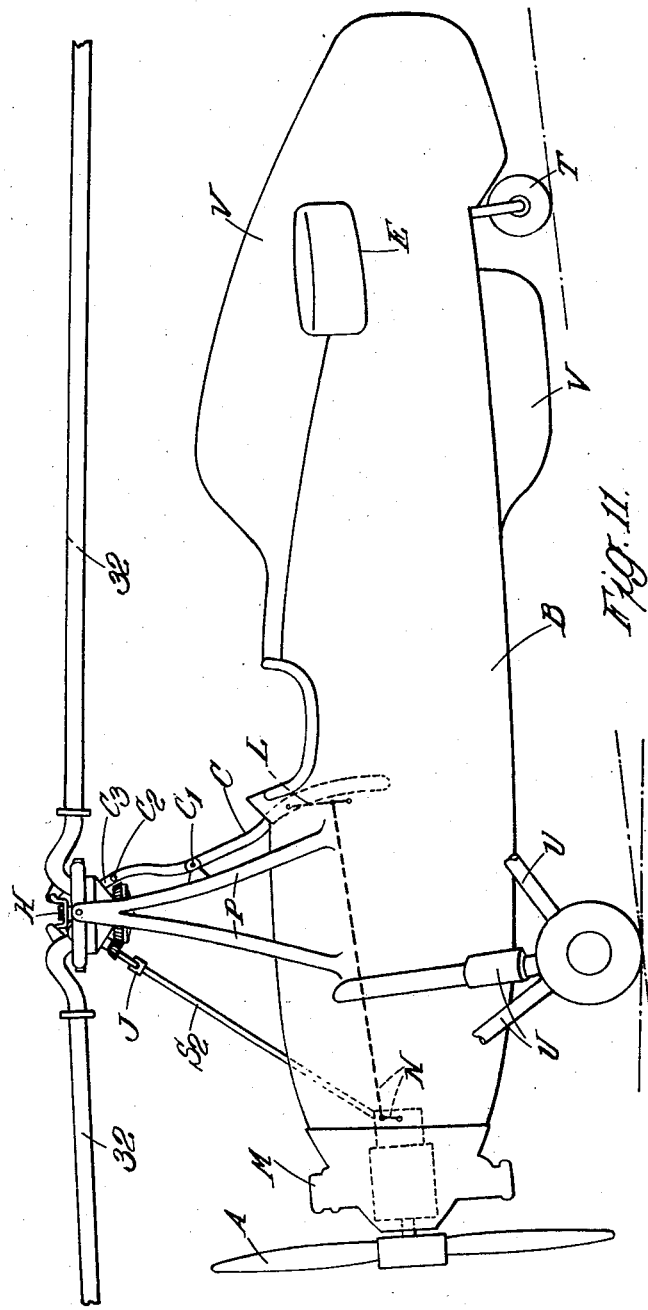

Oct. 8, 1940.                J. DE LA CIERVA                2,216,768
          AIRCRAFT WITH AUTOROTATIVE SUSTAINING ROTORS
                Original Filed April 29, 1937    14 Sheets-Sheet 10
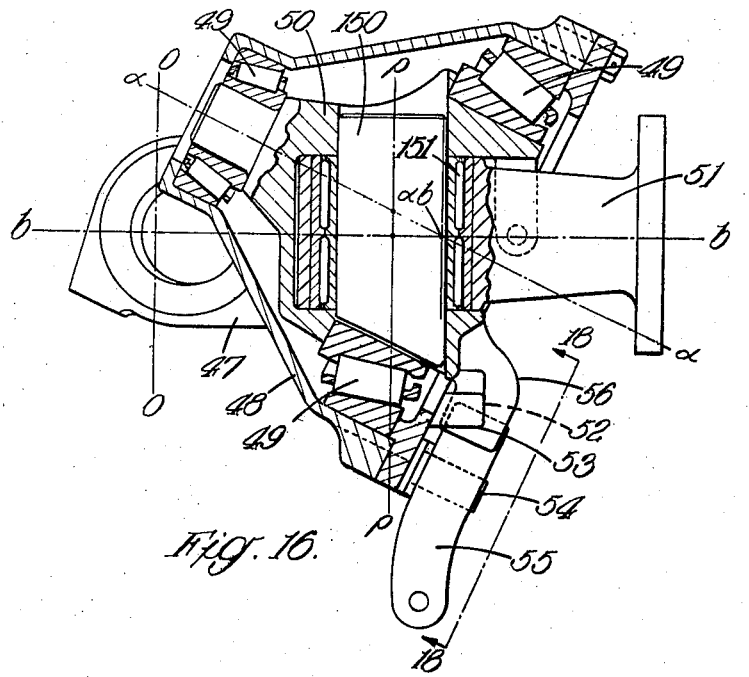
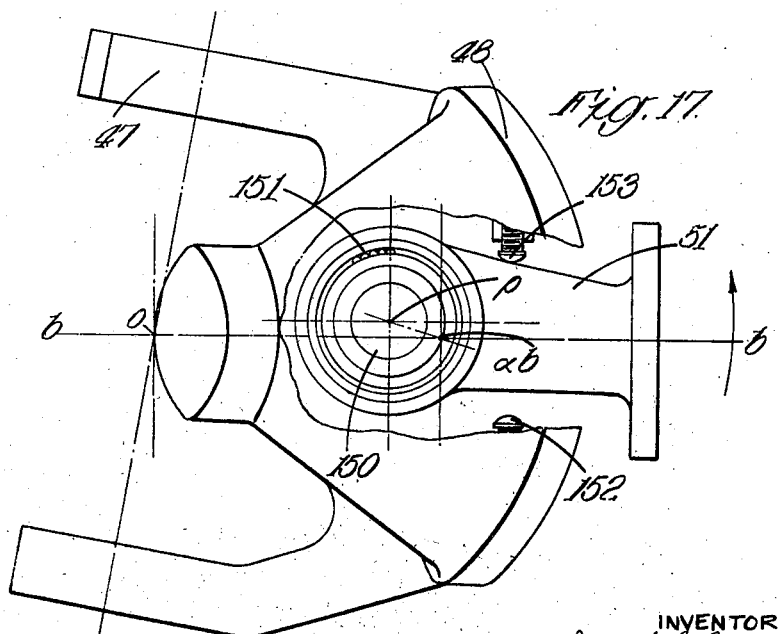

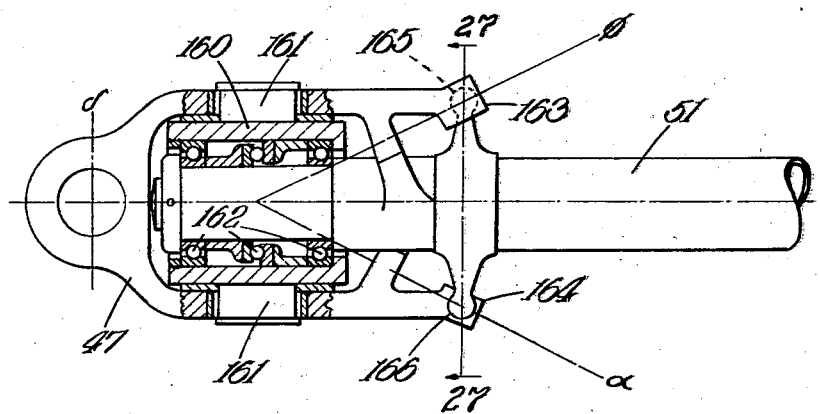
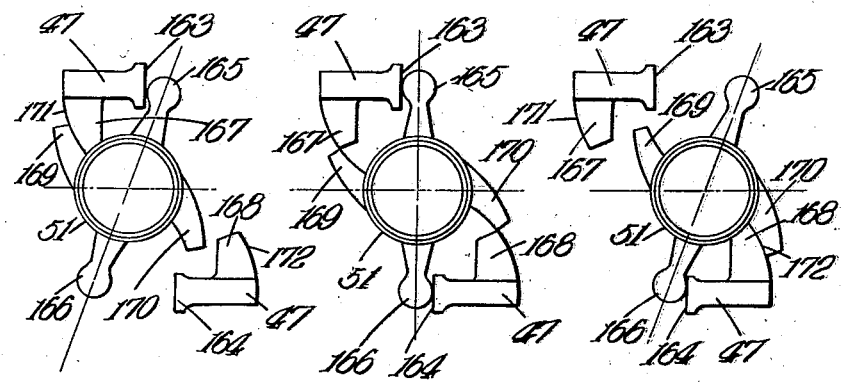

Patented Oct. 8, 1940

2,216,768

UNITED STATES PATENT OFFICE 2,216,768

AIRCRAFT WITH AUTOROTATIVE SUSTAINING ROTORS

Juan de la Cierva, deceased, late of Aldwych, London, England, by John Josselyn, London, England, and Reginald Blake, Aldwych, London, England, administrators, assignors, by mesne assignments, to Autogiro Company of America, a corporation of Delaware Application April 29, 1937, Serial No. 139,814. Renewed June 21, 1939. In Great Britain May 4, 1936

40 Claims. (Cl. 244—18)

This invention relates to aircraft of the kind whose support in flight is derived wholly or mainly from the axial thrust of one or more autorotative sustaining rotors having blades articulated to and radially disposed upon a central rotative member or hub, power for flight being provided by a propulsive engine and airscrew, the aircraft being further provided with means for applying a power drive to the rotor for starting purposes. The source of power used for driving the rotor is usually the propulsive engine itself, for which purpose suitable transmission mechanism is provided, including a clutch for disconnecting the rotor from the engine in flight, but for the purposes of this invention the use of a separate power source which may even be external to the aircraft, though hitherto unusual, is not excluded, the invention being more particularly concerned with improvements of the rotor itself and the driving mechanism closely associated therewith.

The invention is applicable to aircraft having so-called "flapping" rotors (i. e., in which the blades are pivoted for movements generally transverse their rotative path) but is not necessarily restricted thereto, as it is not primarily concerned with flapping but with problems of taking-off by the so-called "jumping start" or "jump off" method consisting in maintaining the blade angle at a decreased value, preferably zero, while the rotor is being power driven, thus allowing it to attain considerably higher speed of rotation than in normal flight and increasing the blade angle to a substantial positive value on cessation of the power drive, whereby the excess kinetic energy stored in the rotor by reason of its high speed is utilised to produce direct lift. Generally considered, the invention involves improvements over the construction disclosed in the copending application of Juan de la Cierva, Serial No. 738,349, filed August 3, 1934 (also disclosed in the corresponding British Patent No. 420,322).

If the rotor blades are so articulated on the hub that leading and lagging displacements thereof are associated with variation of blade angle it is convenient to refer to the correlation between lagging displacement and blade angle variation as the "pitch/lag" characteristic and to designate this characteristic as positive when the blade angle increases with lagging and negative when it decreases with lagging. For the purposes of the "jumping start" it has been proposed to utilise blade mountings giving a negative pitch/lag characteristic, but it has been found that in autorotative flight a pronounced negative pitch/lag characteristic introduces undesirable qualities and complications in the behaviour of the rotor which are absent if the pitch/lag characteristic is zero or positive, and it has further been found that in certain instances at least, and more especially in two-bladed rotors, a positive pitch/lag characteristic may be advantageous.

The main object of this invention is therefore to provide means and methods for obtaining an automatic increase of blade angle on cessation of driving the rotor for "jump off" purposes without incurring the disadvantages associated with the presence in flight of a pronounced negative pitch/lag characteristic.

The invention therefore comprises the provision, in an aircraft having a normally autorotative sustaining rotor whereof the blades are so articulated to the hub as to be capable of a variation of blade angle and in such a manner that in flight the pitch/lag characteristic (as herein defined) is other than negative and the mean blade angle has a suitable positive value, of means for applying a driving torque to the rotor for starting purposes and means operative during the driving of the rotor for restraining the blades from departing from their position of minimum blade angle, which angle is determined by a stop and is preferably about zero, the blades being released from such restraint, on cessation of driving, for automatic movement to a position of substantial positive blade angle.

To obtain the required decrease of pitch when the blades are being driven, means may be provided for holding the blade itself (or an intermediate blade articulating member movable relatively to the hub) in a position of minimum blade angle. For example, a mechanical locking device may be provided which will hold the blade in such position and may be interconnected either with a clutch controlling the application of the drive to the rotor or with a torque responsive device mounted in the transmission line of the driving mechanism, in such a way that the blade locking device is released when the drive to the rotor ceases.

The invention further comprises the method of driving the rotor which consists in so applying the driving forces to the several blades that on each blade the driving force exercises a moment tending to decrease the blade angle and superior to that of the opposed forces, such as drag, inertia and centrifugal forces, about the axis of an articular pivot on which blade-angle-varying movements take place, for which purpose there may be provided a driving member adapted for connection to a source of power and mounted coaxially on the hub and rotatable relatively thereto, at least to a limited extent, and connections between said driving member and the blades themselves or blade articulating members movable relatively to the hub, whereby the driving force is applied to the blades or such blade articulating members in such a way as to move the blades relatively to the hub on their articular mountings into a position of minimum blade angle, determined by suitable stops.

The above method and mechanism are not limited to rotors having a zero or positive pitch/lag characteristic but are applicable to rotors having a negative pitch/lag characteristic which is not sufficiently pronounced to be detrimental in flight, in which case the aerodynamic drag moment may be less than the centrifugal restoring moment when the blades are in the position of minimum blade angle and therefore incapable of holding the blades against the stops determining this position, it being understood that in the known arrangement utilising a blade articulation giving a negative pitch/lag characteristic and wherein the hub is directly driven, the driving forces acting on the several blades, being applied through the pivot mechanism itself, produce no moments about the pivotal axes about which take place the leading and lagging blade movements accompanied by variation of blade angle.

Within the scope of the invention are included certain constructional features relating to the connections between a floating driving member and the blades or appropriate blade articulating members above referred to, such constructional features being hereinafter set forth in the description with reference to the accompanying drawings of specific embodiments of the invention.

It is desirable for reasons unconnected with starting the rotor that the blades should move into positions of minimum blade angle when the rotor is braked as is usually done immediately after landing; the diminution of blade angle substantially destroys the lift of the rotor and prevents the aircraft from being blown into the air again or overturned, and also prevents damage to the blades.

According to a feature of the invention therefore, in an arrangement as described above incorporating a floating driving member, the rotor braking mechanism is arranged to operate on the floating driving member, and connections, other than those for driving the blades, are provided between said driving member and the blades themselves or blade articulating members movable relatively to the hub, whereby the braking force is applied to the blades or such blade-articulating members in such a way as to move the blades relatively to the hub on their articular mountings into the position of minimum blade angle. This feature is not in all cases essential; for, if the blade articulating mechanism has a positive pitch/lag characteristic, diminution of the blade angle on applying the brake will ensue automatically if the brake is applied direct to the hub, but for structural reasons it is frequently convenient to utilise part of the inner surface of the floating driving member as the brake drum and, moreover, by the means described above the blades are positively moved into a position of minimum blade angle.

If the blade articulation mechanism includes an oblique drag or "alpha" pivot (or the equivalent), for example one which is inclined downwardly and outwardly with reference to the blade axis, thus giving the blade a positive pitch/lag characteristic, the position of minimum blade angle is also the position of maximum lead and when the blade is driven in this position the centrifugal restoring moment about the alpha pivot axis is additive to the moments of the drag and inertia resisting forces. This throws an additional bending stress on the blade and additional stresses on the driving elements. The defect can be overcome at the expense of some additional complication by introducing what may be called a relieving pivot which is preferably substantially vertical and serves to articulate the blade to the movable member of the downwardly and outwardly inclined alpha pivot. When the blade is being driven it is free to swing on the relieving pivot into a lagging position so as to relieve said bending stresses, although the movable member of the alpha pivot is held in the leading position by the rotor driving means as described above so as to maintain the reduced blade pitch during driving. Movement of the blade on the relief pivot is limited by stops mounted on the movable member of the alpha pivot.

The relief pivot may be locked in flight, e. g. by any convenient spring catch arrangement which engages when the blade moves into a leading position about the relief pivot and such spring catch may have suitable connections, e. g. with the clutch in the driving transmission, so as to be released when the blades are driven. The relief pivot may however, be made self-locking in autorotative flight by so placing the leading stop of the relief pivot that, in autorotative flight there is a constantly acting centrifugal couple holding the blade against the leading stop of the relief pivot, which is thereby locked.

When the blade is driven the centrifugal couple opposes the resisting couple and relieves the stresses in the blade and on the driving mechanism; and when the resisting couple is large relatively to the centrifugal couple, as it is in starting the rotor from rest, the blades are thrown over onto the lagging stops of the relief pivots.

When first applying the drive (from rest) the torque is initially low (e. g., while the clutch is slipping and before opening the throttle) and as the blades can rest in equilibrium, either on the leading stops or the lagging stops, of the alpha pivot, irrespectively of whether relief pivots are provided or not, it may happen that one blade (or more) is on the lagging stop and does not leave it at once when the drive is applied. On increasing the torque the blade is suddenly thrown over onto the leading stop with a consequent shock to the system. It is therefore desirable to give the blade an inherent tendency to swing onto the leading stop and not to be in equilibrium when on the lagging stop. This may be secured by giving the alpha pivots an inclination transverse to the flapping plane, such that their axes are inclined upwardly and forwardly with reference to the direction of rotation so that when at rest gravity brings the blades onto their leading stops. If this inclination is small, i. e., not more than 10° from the flapping plane, it has no material effect on the flying qualities of the rotor.

As an alternative to the abovementioned method of driving the blades the invention also comprises a method of regulating the blade angle which consists in utilising centrifugal force to create a toggling action and thereby lock one or other of a pair of component pivots or equivalent pivot mechanisms according as the rotor is being driven or is free, the pivot mechanism operative when the rotor is free having a pitch/lag charcteristic other than negative. For this purpose the blades may be articulated on the hub by pivotal mechanism allowing independent movement of each blade relative to the hub about at least two real or virtual axes, movement on either of which has a component in the plane perpendicular to the rotational axis, and on at least one of which the movement has a "pitching" component, causing variation of blade angle, the arrangement being further characterised by a relative disposition of the said axis and of stops limiting the movements thereabout, such that in flight, when the hub is not driven, the blade is free to move about one of said axes, being locked with respect to the other axis by a centrifugal moment acting in opposition to the reaction of a stop and that when the hub is driven the lagging of the blade about the second-named axis gives rise to a centrifugal moment about the first-named axis causing a leading displacement thereabout and locking the blade with respect thereto by its action in opposition to the reaction of another stop, the relative disposition of axes and stops being further such that in the configuration attained when the hub is driven the blade angle is substantially less than in the firstnamed configuration with the hub idle.

In a modification of the above method the toggling action above mentioned may be assisted by a levering action of the blade on a relatively movable part of the pivotal assembly, for which purpose the blade may comprise a part which on the lagging of the blade is brought into engagement with a fulcrum on the pivotal part with respect to which the blade is movable about either axis, thus giving rise to a levering action which assists the centrifugal moment causing a leading displacement about the first-named pivotal axis.

The desired results both for "jump off" and for autorotative flight can be obtained in a rotor wherein the driving force is applied directly to the hub if the blade angle is a minimum when the blades are in their extreme lagging position, but for leading and lagging movement within the range of the normal oscillation experienced in flight the pitch/lag characteristic is other than negative.

The invention therefore further comprises a pivotal blade mounting mechanism comprising an universal or "Cardan" joint and restraints in the form of stops and/or interengaging projections hereinafter referred to as "selector stops" and allowing in succession, movement of the blade about an axis, which may be the axis of a joint pivot or a (virtual) resultant axis substantially fixed in space relative to the joint mechanism, and movement about another such axis, but preventing simultaneous movement about both said axes.

In one form of such pivotal mechanism the universal joint assembly may comprise two joint parts connected respectively with the hub and a rotor blade and an intermediate member pivoted to each of said joint parts, with respect to each of which the movement of the intermediate member is limited in both directions by stops, and wherein the hub-connected and blade-connected joint parts are provided with interengageable projections having concave arcuate faces terminating at the tips of the projections, which are further so shaped and positioned that, when the intermediate joint member is in one of its limiting positions with respect to each of the said joint parts, the tips of the projections just clear each other and the arcuate face of each projection is centered on the axis of the pivot connecting the intermediate member to the part carrying the other projection, and that any displacement of the intermediate member from the above specified position, with respect to either of the said joint parts causes the tips of the projections to overlap in one direction or the other, the tip of one projection riding along the arcuate face of the other projection and locking the joint part carrying said other projection with respect to the intermediate member.

It must be understood that in any pivotal blade articulation mechanism any single pivot with one real axis may be replaced by an equivalent pivotal mechanism having two or more real pivotal axes, the motion about which is correlated, for instance by means of fulcrum devices or gearing, so that the resultant motion takes place about a single virtual axis, the direction of which in space with respect to the relatively fixed part of the pivotal mechanism is substantially constant; thus, the pivotal mechanism that has just been described may be replaced by one whereof the universal joint assembly comprises two joint parts connected respectively with the hub and a rotor blade and an intermediate member pivoted to each of said joint parts, the latter being provided with two sets of engageable elements, whose points of contact constitute fulcrums oppositely disposed with respect to the (real) axis of one of the two pivotal connections, so that the lines joining said fulcrum to the intersection of the two real pivot axes constitute virtual pivot axes oppositely inclined to said first-named real pivot axis, each of said joint parts being further provided with two projections so shaped and disposed that, when both sets of fulcrum elements are in contact the tips of the projections of one joint part just clear those of the other joint part, but when either set of fulcrum elements separate a projection of one joint part overlaps and interlocks with a corresponding projection of the other joint part and is guided thereon by the curvature of the overlapping face of one of said projections, so as to maintain contact between the other set of fulcrum elements, it being therefore impossible for both sets of fulcrum elements to separate simultaneously.

Other features of this invention will appear, and the nature thereof and preferred manners in which it may be performed will be more fully understood, from the following description, with reference to the accompanying drawings, of certain typical examples of aircraft and aircraft sustaining rotors embodying this invention.

In the drawings:

Figs. 11 and 12 are views similar to Figs. 1 and 2 in side elevation and plan respectively of an aircraft embodying an alternative form of sustaining rotor according to the invention;

Fig. 16 is a view in sectional elevation of a modification of the blade articulating pivotal mechanism shown in Figs. 3 to 9;

Fig. 17 is a plan view of the mechanism shown in Fig. 16, partly broken away and omitting certain parts for clearness;

Fig. 26 is a somewhat diagrammatic view in sectional elevation of another form of the blade articulating pivotal mechanism embodying selector stops;

Figs. 27, 28 and 29 are diagrammatic views taken along the line 27—27 of Fig. 26 showing the mechanism in three different positions.

Figure 1:
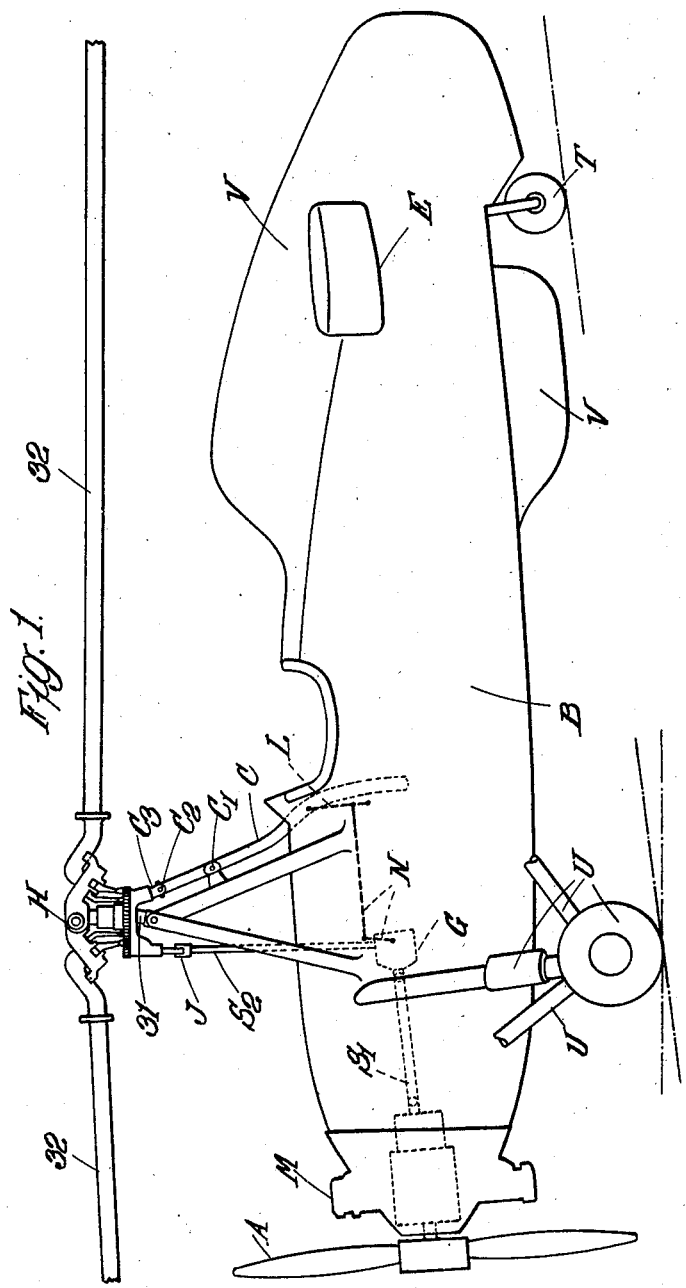
Fig. 1 shows somewhat diagrammatically a sustaining rotor aircraft in side elevation.
Figure 2:
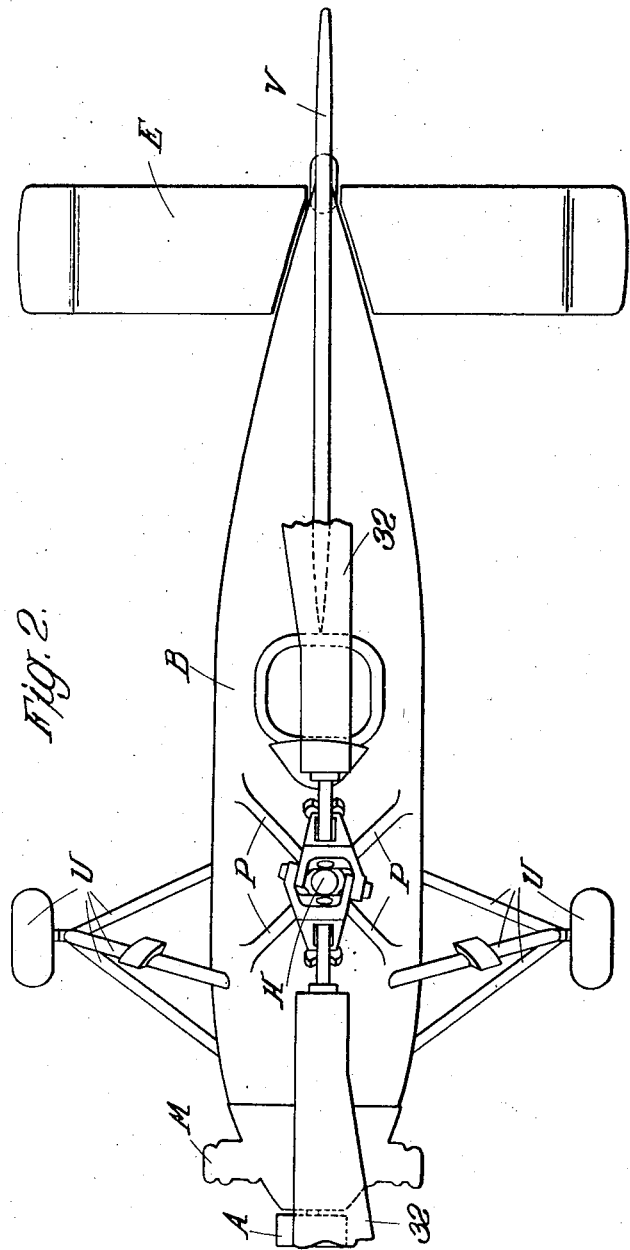
Fig. 2 is a plan view of the same.
Figure 3:
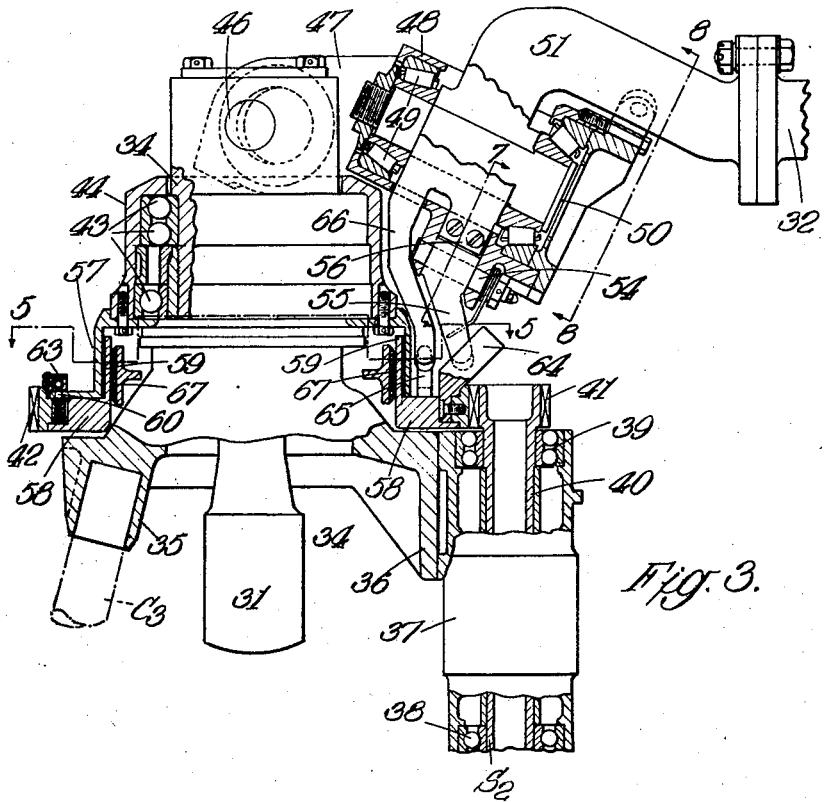
Fig. 3 is a view in side elevation, partly in section, of the rotor head structure of the aircraft of Fig. 1, but viewed from the opposite side and to an enlarged scale.
Figure 4:
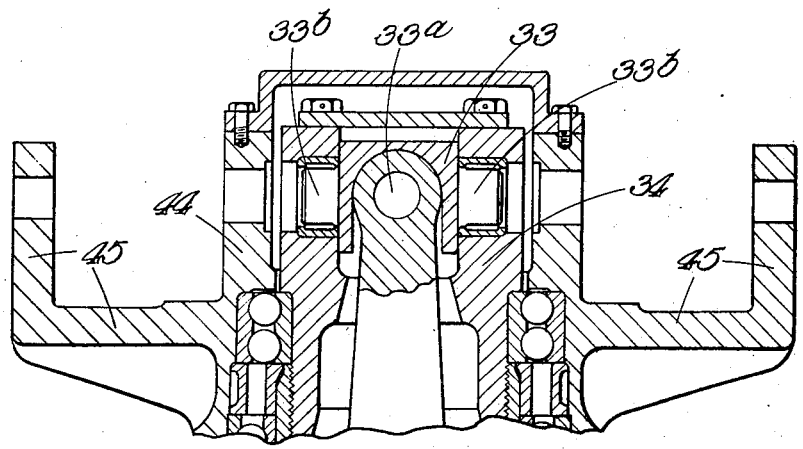
Fig. 4 shows in section the upper part shown in Fig. 3, with the rotor hub rotated through 90° but omitting the greater part of the blade articulating mechanism.

Referring to Figs. 1 and 2, the aircraft comprises a body B, propulsive engine M driving a tractor airscrew A, a wheeled undercarriage U, tail wheel T, fixed vertical stabilising surfaces V and fixed horizontal stabilising surfaces E, a rotor supporting pylon P to which is secured a central mast or pylon extension 31 supporting the rotor head generally indicated at H. The rotor comprises two oppositely directed blades 32. For driving the rotor for starting purposes there is provided transmission mechanism comprising shafting $S_1$ connected to the engine M and upright shafting $S_2$ having driving connections to the rotor illustrated in Figs. 3 and 5, the shafting members $S_1$, $S_2$ being connected by gearing situated in a housing G which also contains a clutch for disconnecting the rotor from the engine, the clutch being controlled by connections diagrammatically indicated at N and operated by a manual control lever L in the pilot's cockpit. The vertical shafting $S_2$ includes a universal joint J at the top and a second universal joint at the bottom (not illustrated). The rotor head H is universally pivoted on the mast 31 as shown in Fig. 4 and is controllable by means of a hanging control column C universally pivoted at $C_1$ on the pylon structure P and again universally pivoted at $C_2$ to an extension $C_3$ of the rotor head structure, the connection of which is shown in Fig. 3.

In all the embodiments and forms of construction herein illustrated and described, the variation of rotor blade angle for obtaining a jumping start is obtained in a fully automatic manner, the blade angle being automatically maintained at the minimum value as long as the driving force is transmitted to the rotor and being automatically increased to a substantial positive value when the drive ceases on disengaging the clutch.

Referring now to Figs. 3 to 9, the upper part of the mast 31 is universally pivoted by means of a trunnion block 33, having pairs of trunnions $33^a$, $33^b$, to a rotor axis member 34 embracing the mast. The lower part of the axis member 34 takes a conical or bell-shaped form and is provided with a socket 35 in which is secured the extension $C_3$ for connection to the control column as shown in Fig. 1. The lower part of member 34 also includes a flange 36 to which is secured a housing 37 in which the upper end of the upright shafting $S_2$ is supported in bearings, of which one is shown at 38. The shafting $S_2$ terminates upwardly in an extension 40 supported in the housing 37 by a bearing 39 and carrying a pinion 41 engaging a ring gear 42 coaxial with the rotor hub.

Figure 7:
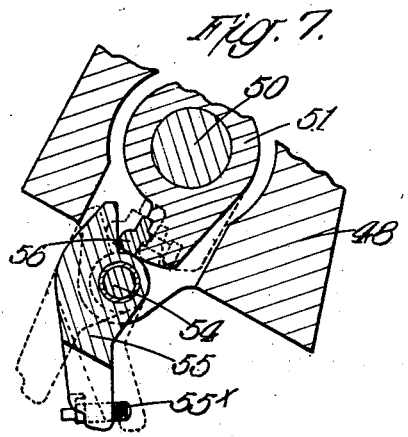
Fig. 7 is a detail view in section taken along the line 7—7 of Fig. 3.

On the axis member 34, is mounted by means of main bearings 43 a hub member 44 on which is borne a pair of oppositely located brackets 45 supporting a pair of coaxial pins 46 constituting a single divided flapping pivot, on which forked drag links 47 are articulated. Each drag link terminates in a housing 48 supporting by means of bearings 49 an "alpha" pivot pin 50 inclined inwardly and upwardly with respect to the blade axis and having secured thereon a goose-necked root member 51 carrying the blade 32 (see Fig. 3). Movement of the blade root 51 on the alpha pivot is limited by means of stops 52, 53 (see Fig. 8) which are preferably adjustable as shown. On the housing 48 is secured a pivot pin 54 parallel to and below the alpha pivot pin 50, and the pivot 54 carries a lever 55, the upper end of which is adapted to engage a projection 56 on the root member 51 (see Figs. 3 and 7). In Fig. 7 the lever 55 and projection 56 are shown in a middle position, the extreme positions of these parts being indicated in dotted lines.

Figure 5:
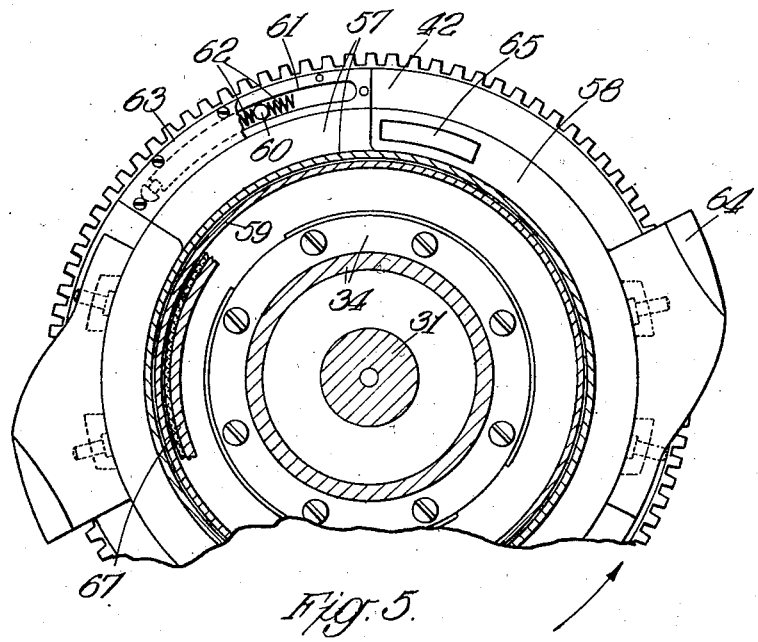
Fig. 5 is a sectional view taken along the line 5—5 of Fig. 3.
Figure 6:
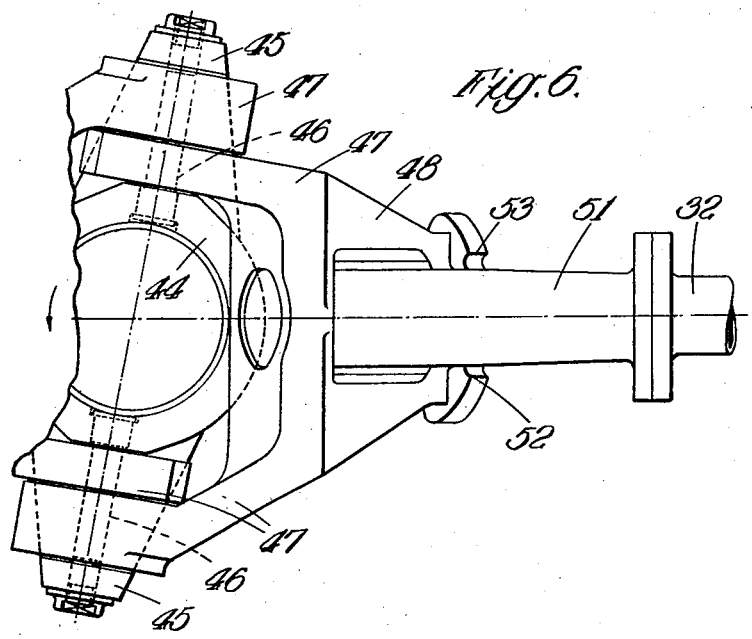
Fig. 6 is a plan view of the rotor head shown in Fig. 3, partly broken away and omitting parts clearly shown in other figures.

The hub member 44 terminates downwardly in a flanged extension 57, and a coaxial floating driving member 58 carrying the ring gear 42 is rotatable on the flanged part 57, the relative angular displacement between these two members being limited by means of pins 60 projecting from the member 58 through slots 61 in the member 57 so that relative movement between the parts 57 and 58 is checked when the pins 60 reach either end of the slots 61 (see Fig. 5). When the rotor is not driven the member 58 is retained at or near the mid-point of its relative travel with respect to the member 57 by means of springs 62 abutting on the pins 60 and enclosed in covers 63.

The member 58 further comprises an upwardly extending flange 59 lying within the member 57 and serving as a brake drum against which the shoes 67 of the rotor brake can be applied (see Figs. 3 and 5).

To the member 58 are secured driving lugs 64 which engage the lower ends of the levers 55, which are preferably provided with adjustable abutment screws 55ˣ. The member 58 is further provided with a second pair of lugs 65, adapted to engage arms 66, integral with and projecting downwardly from the blade root members 51, when the member 58 is made to lag relatively to the hub 44, as occurs when the member 58 is braked by applying the shoes 67 to the drum 59.

Figure 8:
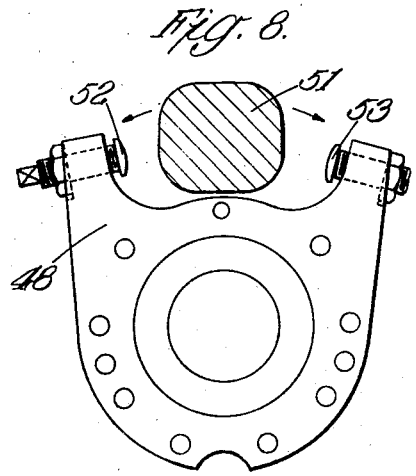
Fig. 8 is a detail view in section taken along the line 8—8 of Fig. 3.
Figure 9:
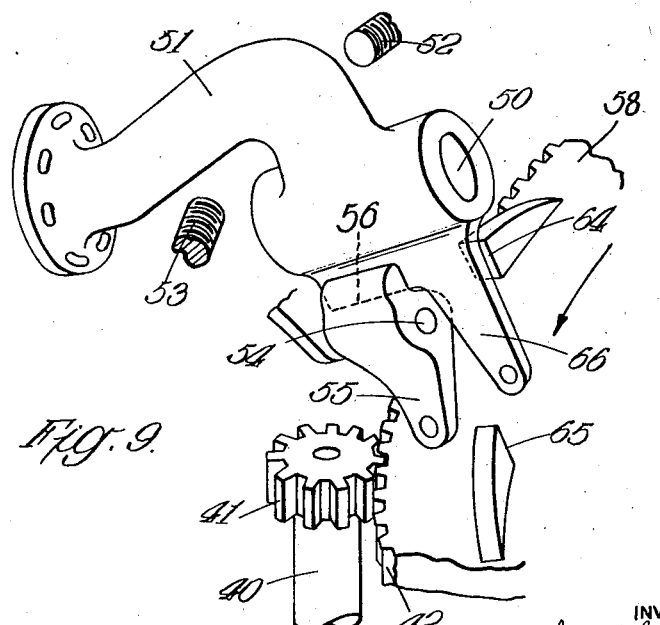
Fig. 9 is a somewhat diagrammatic view in perspective illustrating the operation of certain parts shown in Figs. 3 to 8.

The operation of this mechanism will be understood more clearly by inspection of Fig. 9 showing the principal parts somewhat diagrammatically in perspective. When the driving ring 42 is driven by the pinion 41 in the direction of the arrow in Fig. 9, the floating driving member 58 overruns the hub and the driving lug 64 engages the lower end of the lever 55, which is rocked about the pivot 54, and the upper end of the lever 55 engages the projection 56 of the blade root 51 and rocks the latter about the alpha pivot 50 into engagement with the leading stop 53 of the alpha pivot. As the alpha pivot is inclined inwardly and upwardly it has a positive pitch/lag characteristic so that in the position of maximum lead the blade angle is a minimum. On cessation of the drive the hub is free to overrun the floating driving member 58 and the centrifugal force acting on the blade restores it to about its mean radial position, the root member 51 being about half way between the stops 52, 53 as shown in Fig. 8 so that the blade angle is increased to a substantial positive value.

By suitably proportioning the lever arms of the members 55, 56 about their respective axes the driving force applied to the blade by the lever 55 may be made to exert a moment about the axis of the pivot 50 sufficient to hold the blade against the leading stops 53 even at the highest revolutions attained, at which time the sum of the aerodynamic drag and centrifugal restoring moments about the alpha pivot (50) is a maximum.

Figure 10:
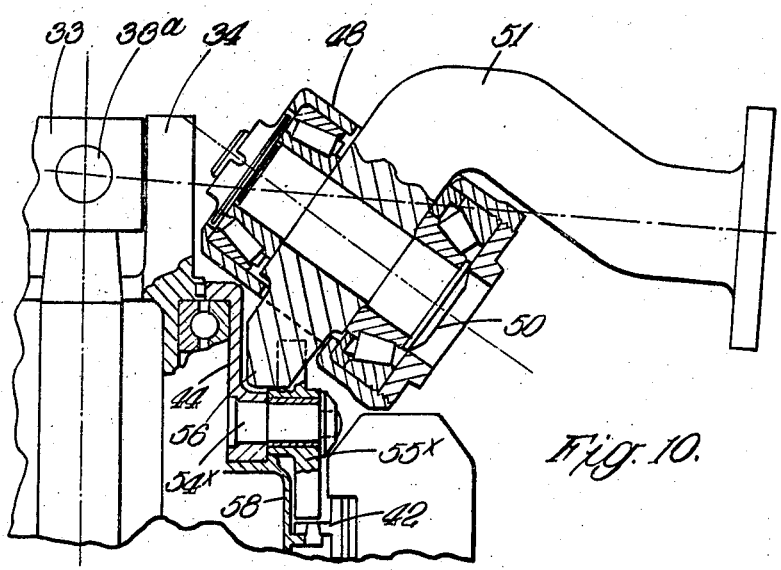
Fig. 10 is a partial view in elevation, partly in section, illustrating a modification of the arrangement illustrated in Figs. 3 to 8.

Fig. 10 illustrates a modification in which the levers for transferring the drive from the driving lugs 64 of Fig. 3 to the projections 56 of the blade roots 51 are pivoted on the hub instead of on the drag link housing. In Fig. 10 the hub 44 carries pivot pins 54ˣ on which are mounted levers 55ˣ whose lower ends are engaged by driving lugs (not shown) mounted on the floating driving member 58 and whose upper ends engage the projections 56 of the blade roots 51. In other essential parts the mechanism corresponds with that shown in Figs. 3 to 8.

Figure 15:
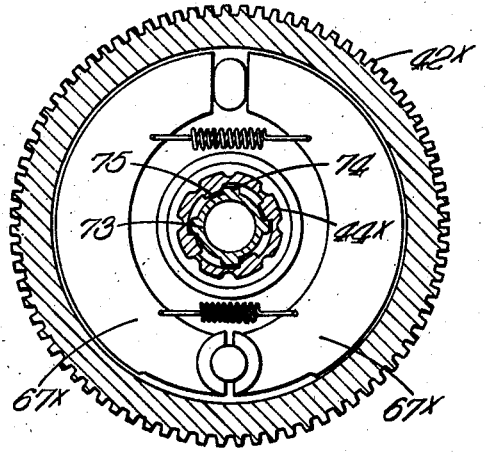
Fig. 15 is a sectional plan view taken along the line 15—15 of Fig. 13.
Figure 12:
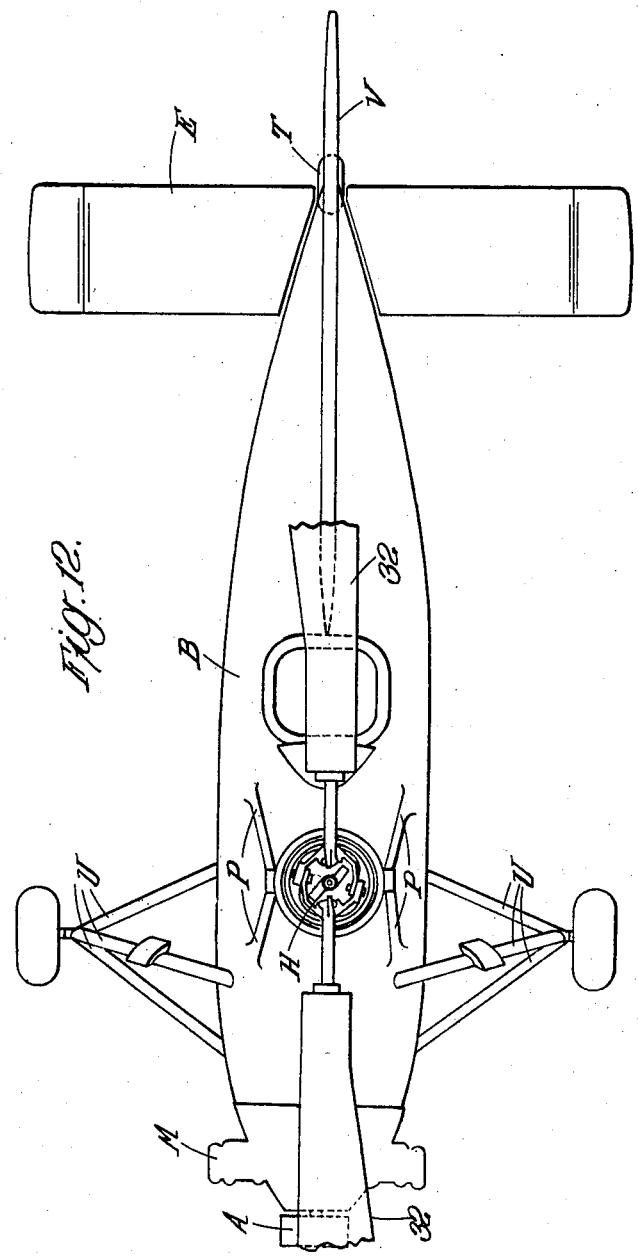
Figure 13:
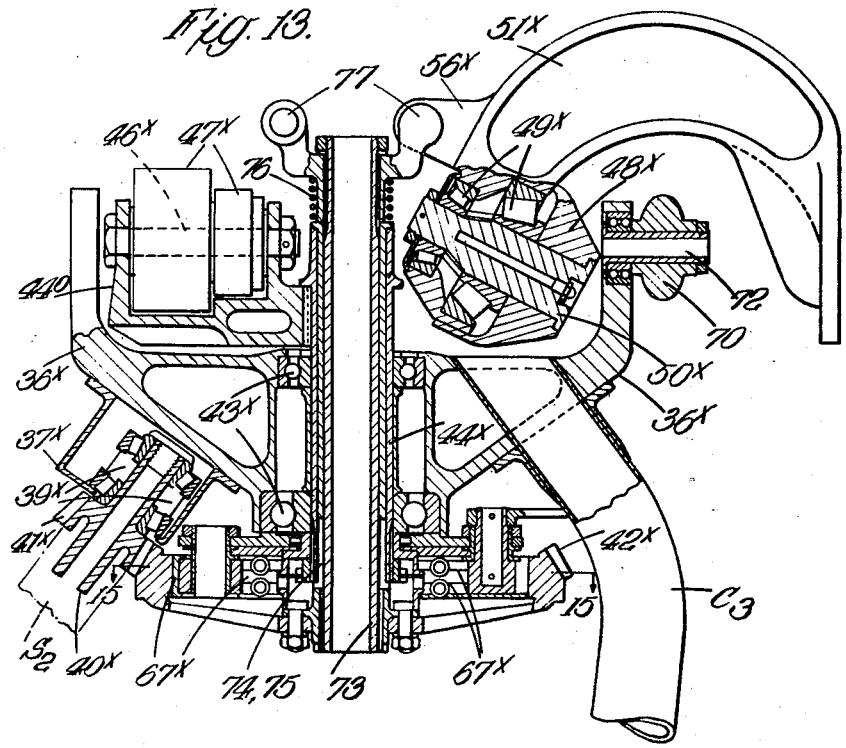
Fig. 13 is a view to an enlarged scale in sectional elevation of the rotor head of the aircraft illustrated in Figs. 11 and 12.
Figure 14:
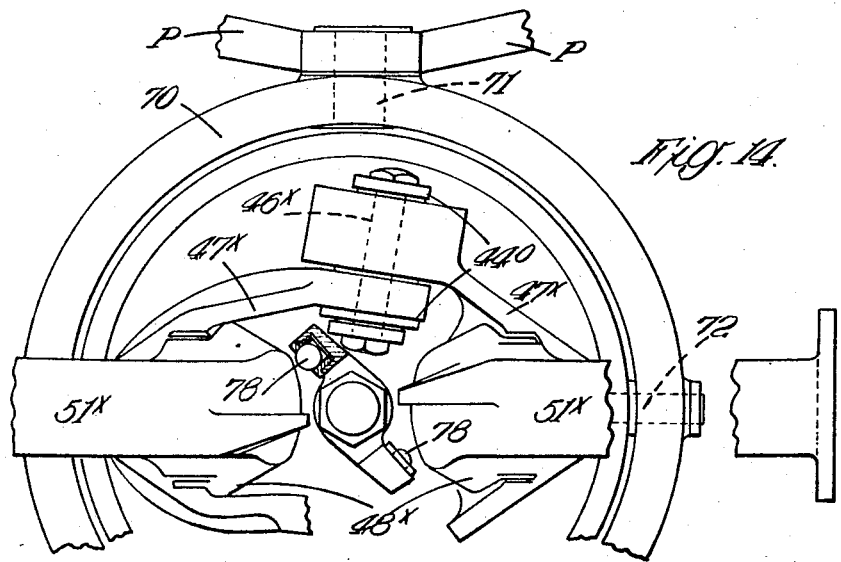
Fig. 14 is a fragmentary plan view, partly in section, of the structure of Fig. 13.

A sustaining rotor aircraft with a somewhat modified arrangement is shown in Figs. 11 and 12 corresponding to Figs. 1 and 2. The general arrangement of the aircraft is similar to that of Figs. 1 and 2, the only difference being in respect of the transmission shafting, the part S₁ being omitted and the part S₂ carrying the rotor driving pinion being not upright, but oblique, and in respect of the rotor head and its mounting, which are better shown in Figs. 13 to 15, the pylon structure being suitably modified accordingly. It will be seen from Figs. 13 to 15 that the rotor axis member 36ˣ, comprising an extension C₃ for the control connection and a housing 37ˣ for the bearings 39ˣ supporting the upper extension 40ˣ of the drive shafting S₂ carrying the driving pinion 41ˣ, is universally mounted by means of a gimbal ring 70, pivoted at 71 to the pylon structure P, P and at 72 to the axis member 36ˣ, the axes of the gimbal pivots being mutually perpendicular. The axis member 36ˣ is hollow and the rotor hub comprises an axle 44ˣ mounted within the member 36ˣ, on bearings 43ˣ, and a bracket member 44° integral with axle 44ˣ and carrying the pins 46ˣ of a single divided flapping pivot on which the forked drag links 47ˣ terminating in alpha pivot housings 48ˣ are articulated. To show the bracket member 44°, the left hand part of Fig. 13 shows the hub rotated through 90° from the position shown in the right hand half of the figure. The axle 44ˣ is hollow and within it is a coaxial shaft 73, constituting the floating driving member, which carries the ring gear 42ˣ, meshing with the pinion 41ˣ. Relative movement of the shaft 73 and axle 44ˣ is limited by a splined joint between these members, of which the splines 74, 75, (see Figs. 13 and 15) have a large clearance, e. g. about 25°. To prevent chattering and shock the axle 44ˣ and shaft 73, are connected at the top by helical spring 76 operating in torsion. At the top, the shaft 73 carries lugs 77, which engage projections 56ˣ, on the blade root members 51ˣ, the points of contact between the lugs and projections, accurately defined by balls 78 mounted in sockets of the lugs 77, being above the axes of the alpha pivots articulating the blade roots to the drag links, said alpha pivots being constituted by pivot pins 50ˣ and bearings 49ˣ. The alpha pivot axes are inclined inwardly and upwardly as in Fig. 3, giving a positive pitch/lag characteristic. Application of the driving force direct to the blade at a point above the alpha pivot axis produces a moment about the alpha axis tending to rotate the blade into a leading position, and as before this moment can be made greater than the sum of the aerodynamic resisting moment and the centrifugal restoring moment, even at the highest speeds of rotation, by suitably proportioning the lever arms of the lugs 77 and projections 56ˣ. In this example the rotor brake shoes 67ˣ operate on the interior of the ring gear 42ˣ.

Application of the brake will cause the shaft 73 to lag relatively to the hub until the faces of the splines 74, 75 opposite to the driving faces, engage whereupon the braking force will be transferred to the hub and the blades will swing onto the leading stops of the alpha pivots, thus decreasing the blade angle to the minimum value.

Figure 18:
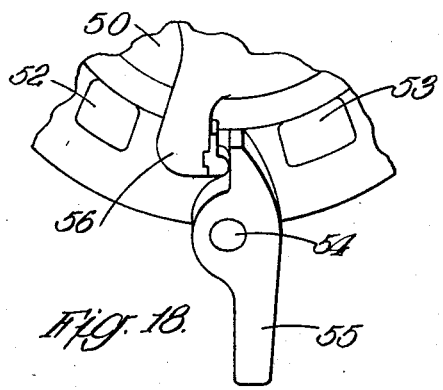
Fig. 18 is a detail view taken along the line 18—18 of Fig. 16.

Figs. 16, 17 and 18 illustrate a modification in which a blade articulating pivotal mechanism having an alpha pivot is also provided with a relief pivot for relieving the bending stresses in the rotor blade and reducing stresses in the driving mechanism. In this arrangement the pin 50 of the alpha pivot is not connected directly to the blade root member 51 but carries a pivot pin 150, whose axis when the blade is horizontal is substantially parallel to the rotational axis O—O, and the blade root member 51 is rotatable on the pivot 150 by means of a bearing 151. In this example the stops 52, 53 of the alpha pivot mechanism are mounted below the blade axis and engage the projection 56, which in this instance is integral with the pivot pin 50 and not with the root member 51. The projection 56 is also engageable by the lever 55 as in the examples already described. Movement of the blade root 51 on the relief pivot is limited by stops 152, 153.

The leading stop 153 of the relief pivot is so placed that in flight the blade root 51 is held against the stop 153 by a centrifugal moment acting about the axis of the relief pivot. The direction of rotation of the rotor is indicated by an arrow.

When the additional pivot 150 is used as above described in combination with a floating driving member applying the driving force direct to the movable member 50 of the alpha pivot, e. g. by the levers 55, the function of the additional pivot is merely to relieve excessive stresses in the blades and driving mechanism, and in this case correct functioning of the device does not depend primarily on the functioning of the relief pivot but on the location of the leading stop 153.

Figure 19:
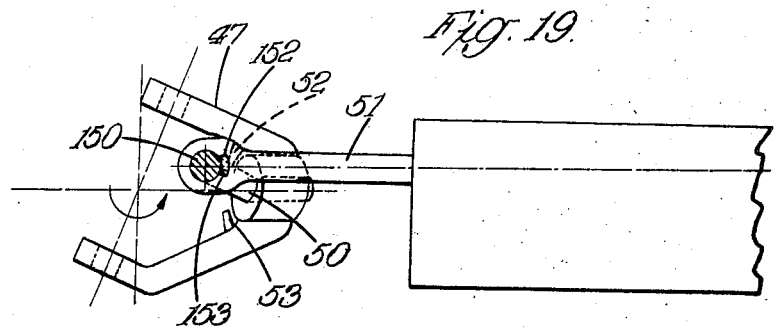
Fig. 19 is a diagrammatic view in plan to illustrate the toggling action of a pivotal mechanism similar to that of Figs. 16 to 18 adapted for a direct drive to the hub.
Figure 20:
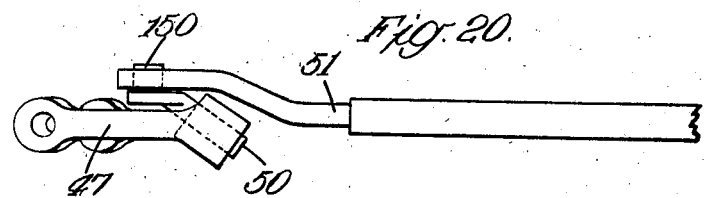
Fig. 20 shows diagrammatically the parts of Fig. 19 in side elevation.
Figure 21:
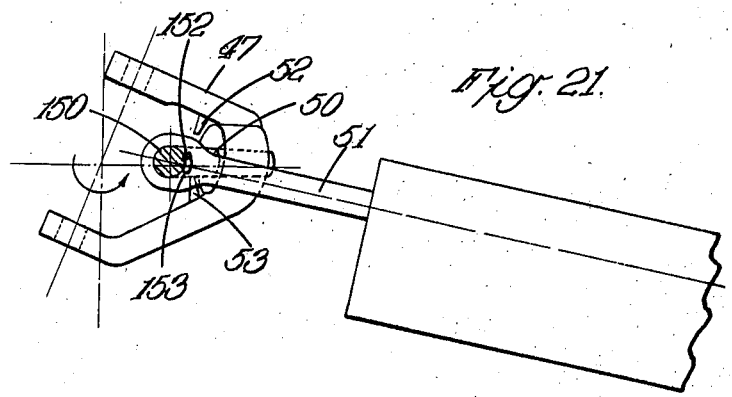
Fig. 21 is a view similar to Fig. 19 showing the parts in another position.

However, by suitably locating an additional pivot of the kind shown in Figs. 16 to 18 and appropriate disposition of stops, the mechanism may be made to have a toggle action as hereinbefore mentioned, whereby the necessity for applying the drive direct to the movable members of the alpha pivots may be avoided and the floating driving member eliminated, the drive being transmitted direct to the hub. In Figs. 16 to 18 the additional pivot is actually shown in the required position for this purpose and it must therefore be understood that these figures really represent two distinct mechanisms, in the first of which, already described, the location of the pivot 150 in the position shown is not essential, but the application of the drive to the member 50, e. g., in the manner shown, is essential, whereas in the second mechanism represented in these figures the lever 55 is understood to be dispensed with and the drive applied to the hub. In this case the axis of the relief pivot 150 must be located as shown. In these figures the main rotational axis is indicated by the line O—O, the longitudinal blade axis by the line $b$—$b$, the axis of the alpha pivot pin 50 by the line $\alpha$—$\alpha$, and the axis of the additional pivot 150 by the line $\rho$—$\rho$. The alpha pivot axis and the blade axis intersect at a point denoted $\alpha b$ and it will be noticed that the axis $\rho$—$\rho$ of the additional pivot lies nearer the rotational axis than this point of intersection $\alpha b$. When the additional pivot axis is so placed the required toggle action is obtained. This will be more easily understood by reference to Figs. 19 to 21, in which the essential parts of the mechanism, indicated by the same reference numbers as in Figs. 16 to 18, are shown in a diagrammatic manner in two positions; Fig. 19 showing the configuration when the hub is free, i. e., not driven, as occurs in flight; Fig. 21 showing the configuration when the hub is driven. Fig. 20 shows the parts in elevation.

In Fig. 21 the aerodynamic reaction on the blade causes it to lag about the pivot 150, the centrifugal force applied at the axis of pivot 150 giving rise to a moment, which rotates the alpha pivot member 50 in a leading direction and holds it against the leading stop 53 of the alpha pivot. When the drive ceases the blade swings in a leading direction about the pivot 150 until the line of centrifugal force passes to the leading side of the alpha pivot axis and thereby rotates the alpha pivot member 50 in a lagging direction so as to increase the blade angle, the leading stop 153 of the additional pivot 150 being so placed that the centrifugal restoring moment acting about the pivot 150 locks the blade against the stop 153, as shown in Fig. 19.

As in the position shown in Fig. 19 the blade is locked on the additional pivot 150 by centrifugal force, any leading and lagging oscillation of the blade in flight takes place by movement of the alpha pivot member 50 so as to give a positive pitch/lag characteristic in flight.

Figure 22:
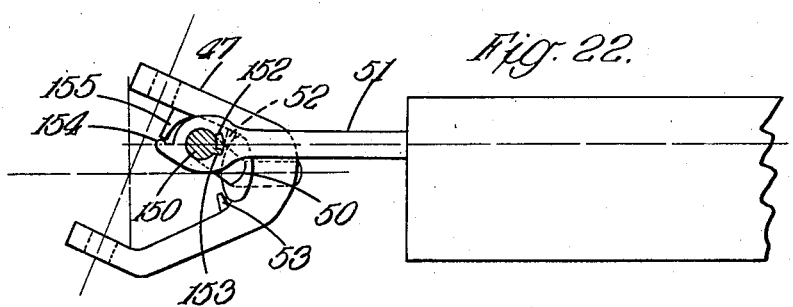
Figs. 22 and 23 are diagrammatic views similar to Figs. 19 and 21 respectively illustrating a further modification.
Figure 23:
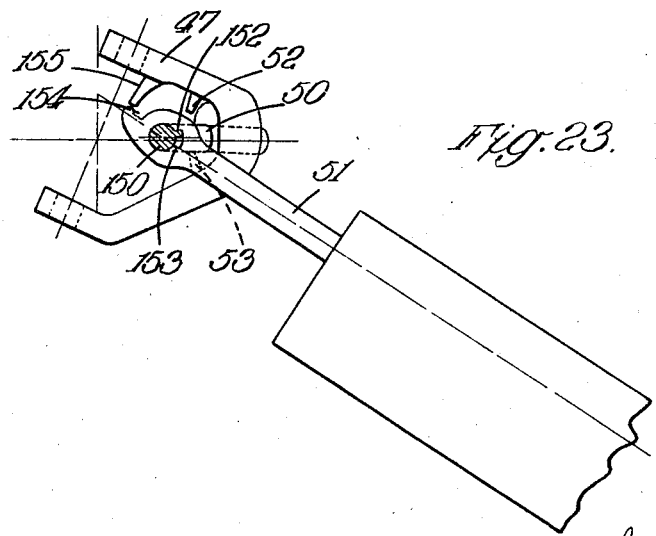

By reason of the toggling action the movement of the alpha pivot member 50 towards the leading stop 53, i. e., from the position of Fig. 19 to that of Fig. 21, is liable to occur somewhat suddenly, causing the member 50 to be brought against the stop 53 with a somewhat violent shock. To avoid this the mechanism may be modified as shown in Figs. 22 and 23 by introducing a fulcrum 155 on the leading side of the drag link 47 which is engaged by a spur or projection 154 on the blade root member 51 lying nearer the rotational axis than the axis of the additional pivot 150.

When the drive is applied the blade lags about the pivot 150 and brings the projection 154 into engagement with the fulcrum 155, thereby exerting a levering action which rotates the alpha pivot member in a leading direction, bringing it against the leading stop 53 in a smoother and more progressive manner than if the toggling action alone were relied on.

The mechanisms so far herein particularly described have the common feature that the movable member of an "alpha" pivot giving positive pitch/lag characteristic is held in the leading position when the blade is driven. Figs. 24 to 29 show mechanisms in which the blade in proceeding from lagging to leading position moves successively about an axis having negative pitch/lag characteristic and about a second axis having positive pitch/lag characteristic, simultaneous movement about both axes being prevented by interlocking members conveniently referred to as "selector-stops."

Figure 24:
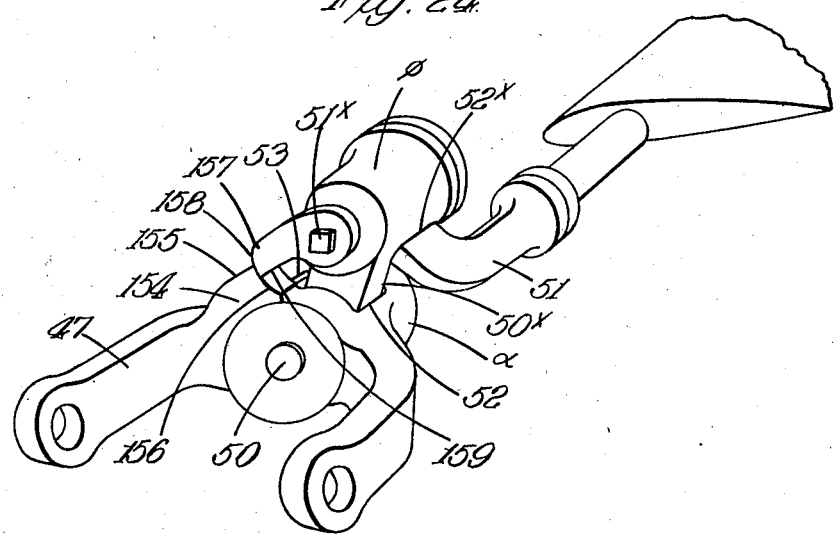
Fig. 24 is a somewhat diagrammatic view in perspective of a blade articulating pivotal mechanism incorporating "selector stops"
Figure 25:
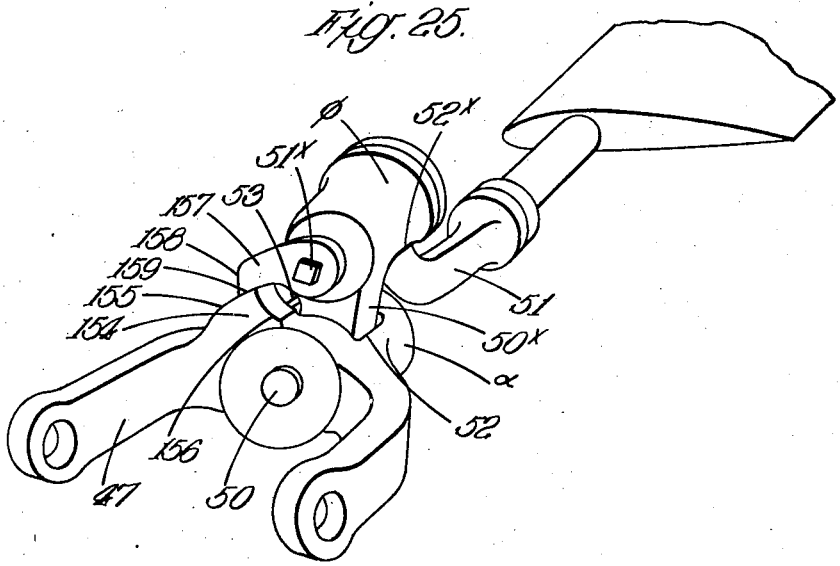
Fig. 25 is a view similar to Fig. 24 showing the parts in a different position.

In Figs. 24 and 25 the axes on which the blade moves are real, the blade articulation comprising a universal or "Cardan" joint connecting the drag link 7 with the blade root member 51. The drag link carries an "alpha" pivot whose axis is inclined inwardly and upwardly to the blade axis and whose pivot pin 50 is fast on an intermediate member $50^x$ carrying a "phi" pivot, whose axis is inclined outwardly and upwardly to the blade axis and whose pivot pin $51^x$ is fast on the blade root member 51. Movement on the alpha pivot is limited by stops 52, 53 and on the "phi" pivot by a lagging stop $52^x$ and a leading stop (not shown). The drag link further includes a projection 154 having an arcuate convex face 155 concentric with the alpha pivot pin 50 and arcuate concave face 156 concentric with the phi pivot pin $51^x$, when the intermediate member $50^x$ is on the lagging stop 52 of the alpha pivot. Similarly on the pivot pin $51^x$ is secured a projecting member 157 having arcuate faces 158, 159, face 158 being convex and centred on the axis of the pivot pin $51^x$ and of the same radius as face 156 of projection 154, and face 159 being concave and of the same radius as face 155 of projection 154 and concentric with pivot pin 50 when the blade root member 51 is against the leading stop (not shown) of the phi pivot. The way in which projections 154, 157 interlock is clearly shown in the drawings, Fig. 24 showing the alpha pivot locked on the lagging stop 52, by engagement of faces 156, 158, which slide on one another as the blade moves on the phi pivot, and Fig. 25 showing the phi pivot locked on its leading stop by engagement of faces 155, 159, which slide on one another as the member $50^x$ moves on the alpha pivot. Fig. 25 shows the configuration obtaining in flight with the phi pivot locked and positive pitch/lag characteristic given by the alpha pivot. Marked lagging of the blade, as occurs when the hub is driven, brings the mechanism into the configuration of Fig. 24 with the alpha pivot locked and negative pitch/lag characteristic, so that the blade angle is decreased by further lagging, the stops 53 and 52ˣ being preferably so placed that both give a minimum blade angle of zero value.

Figs. 26 to 29 show an alternative arrangement operating on the same principle with virtual axes or "resolved pivots". The blade root 51 is connected to the drag link 47 by an intermediate member 160 having trunnions 161 rotatable in the drag link about a substantially vertical axis giving a lagging and leading movement of the blade without blade angle variation and the blade 51 is rotatable on its longitudinal axis, giving blade angle variation only, in bearings 162 in the member 160. This arrangement has the advantage that the bearings 162 are only loaded substantially axially and the bearings of the trunnions 161 carry no thrust load. The drag link 47 carries fulcrums 163, 164, above and below the blade axis, respectively engageable by levers 165, 166 mounted on the blade. When the upper fulcrum 163 is engaged, the blade moving on both pivots 161, 162, rotates about a virtual axis joining the fulcrum with the point of intersection of the axes of pivots 161, 162 and inclined upwardly and outwardly to the blade axis, so as to give a negative pitch/lag characteristic; this axis is indicated by the reference $\phi$. Similarly when the lower fulcrum 164 is engaged the blade rotates about an oppositely inclined virtual axis $\alpha$. The fulcrums face in opposite directions and the blade is prevented from rotating on the pivot bearing 162 without movement of the pivot 161 in a manner to cause both levers 165, 166 to separate from their fulcrums, by interengaging projections 167, 168 on the drag link and 169, 170 on the blade root, projections 167, 168 having convex faces 171, 172 on which the tips of the projections 169, 170 ride when the blade moves about the fulcrums 163, 164 respectively. Fig. 28 shows the blade in the mean radial position in which the blade angle is a maximum and the tips of both projections 169, 170 just clear projections 167, 168. When the blade lags projections 167, 169 interlock and hold the lever 165 on fulcrum 163 so that the blade rotates on the axis $\phi$ and decreases the blade angle, as shown in Fig. 27, and when the blade leads projections 168, 170 interlock and hold the lever 166 on the fulcrum 164 causing the blade to rotate on the axis $\alpha$ and again decrease its blade angle, as shown in Fig. 29. Leading and lagging movements are limited by engagement of the ends of projections 168, 167 with the blade root as shown.

It will be seen that all the mechanisms herein described and shown display the following characteristics; (a) the rotor blades are positively located in the low pitch position during application of the driving torque; (b) when the rotor is not driven the means blade angle is substantially positive and the pitch/lag characteristic is at least other than substantially negative; (c) the pitch/lag characteristic is strictly determinate, at least when the rotor is rotating at a substantial speed; i. e., the pivotal mechanism providing for leading and lagging movements provides only one degree of freedom at any instant; (d) this latter characteristic (c) is positively assured by the nature of the mechanism and in particular is independent of the relative positions of the aerodynamic centres of pressure and mass centres of the blades, the mechanism being actuated solely by the driving force, the resistance to driving the blade (aerodynamic and inertia) and in some examples the centrifugal force of the blade. Thus the mechanism is unaffected by the aerodynamic-centrifugal pitching moment acting about the longitudinal axis of the blade, which moment may therefore be of either sign. The aerodynamic centre of pressure and mass centre of the blades may therefore be determined by operating and structural considerations without regard to the primary requirements of the jump-off problem. In particular, the aerodynamic centre of pressure of the blades may be located rearwardly of the mass centre, i. e., nearer the trailing edge of the blade, as is in certain cases desirable for reasons connected with improvement of the behaviour of the rotor in flight.

What is claimed is:

1. An aircraft sustaining rotor including a hub, blades, articulating members connecting the blades to the hub for variation of blade pitch angle, a driving member adapted for connection to a source of power and mounted coaxially with the hub and rotatable relatively thereto, at least to a limited extent, and connections between said driving member and the blades themselves whereby the driving force is applied to the blades in such a way as to move the blades relatively to the hub on their articular mountings into a position of minimum blade angle.

2. In an aircraft sustaining rotor including a hub and a blade articulated thereon, blade mounting mechanism providing a plurality of virtual pivot axes comprising substantially a universal joint, and interengaging restraining members providing for successive movement of the blade about one such axis and about another such axis, but preventing simultaneous movement about both said axes.

3. In an aircraft sustaining rotor, pivotal blade mounting mechanism as claimed in claim 2 including an universal joint assembly comprising two joint parts connected respectively with the hub and a rotor blade and an intermediate member pivoted to each of said joint parts, the latter being provided with two sets of engageable elements, whose points of contact constitute fulcrums oppositely disposed with respect to the (real) axis of one of the two pivotal connections, so that the lines joining said fulcrums to the intersection of the two real pivot axes constitute virtual pivot axes oppositely inclined to said first named real pivot axis, each of said joint parts being further provided with two projections so shaped and disposed that, when both sets of fulcrum elements are in contact the tips of the projections on one joint part just clear those of the other joint part, but when either set of fulcrum elements separate a projection of one joint part overlaps and interlocks with a corresponding projection of the other joint part and is guided thereon by the curvature of the overlapping face of one of said projections, so as to maintain contact between the other set of fulcrum elements, it being therefore impossible for both sets of fulcrum elements to separate simultaneously.

4. In an aircraft, a sustaining rotor having a hub, a blade having its sectional center of pressure located rearwardly of its sectional center of gravity, and pivot mechanism for mounting the blade on the hub and including pivot means providing for decrease of pitch upon leading displacements of the blade from the mean radial position, means for applying a driving torque to the rotor, and means for maintaining the blade in a leading and therefore a low pitch position during the application of a driving torque.

5. In an aircraft, a sustaining rotor having a hub, a blade and pivot mechanism for mounting the blade on the hub and providing a pivot axis inclined outwardly and downwardly with respect to the longitudinal axis of the blade, whereby leading displacements of the blade about said axis are accompanied by decrease in pitch thereof and lagging displacements of the blade about said axis are accompanied by increase in pitch thereof, and mechanism for driving the rotor including a drive connection extended to said blade above the axis of said pivot so as to urge the blade to a leading position as a result of the application of driving torque.

6. In an aircraft sustaining rotor, a hub, a blade with its sectional center of pressure located rearwardly of its sectional center of gravity, pivot mechanism for mounting the blade on the hub and providing two real or virtual pivot axes one of which is inclined downwardly and outwardly and the other of which is inclined upwardly and outwardly with respect to the longitudinal axis of the blade, and means restricting movement about the second of said axes during normal flight operation, whereby under the influence of normal flight forces lagging and leading of the blade takes place about the first of said axes.

7. In an aircraft sustaining rotor, a hub, a blade, and pivot mechanism for mounting the blade on the hub and providing a pivot axis inclined outwardly and downwardly with respect to the longitudinal blade axis, and a generally upright pivot axis, the blade root being associated with the upright pivot axis, and the upright pivot axis being located nearer to the axis of rotation than the point of intersection of said inclined pivot axis with the plane in which the blade axis moves about the generally upright pivot axis.

8. In an aircraft sustaining rotor, a hub, a blade, pivot mechanism for mounting the blade on the hub and providing a pivot axis inclined outwardly and downwardly with respect to the longitudinal blade axis, a generally upright pivot axis, the blade root being operatively associated with the upright pivot axis, and the upright pivot axis being located nearer to the axis of rotation than the point of intersection of said inclined pivot axis with the plane in which the blade axis moves about the generally upright pivot axis, and means limiting lagging movement of the blade about said upright pivot axis, said means including stop devices cooperating with the blade root and a pivot part of the mechanism providing said inclined pivot axis.

9. In an aircraft sustaining rotor, a hub, a blade, pivot mechanism for mounting the blade on the hub and providing a pivot axis inclined outwardly and downwardly with respect to the longitudinal blade axis, and a generally upright pivot axis, the blade root being operatively associated with the upright pivot axis, and the upright pivot axis being located nearer to the axis of rotation than the point of intersection of said inclined pivot axis with the plane in which the blade axis moves about the generally upright pivot axis, and the upright pivot axis further being offset forwardly of the inclined pivot axis, at least in normal flight, with respect to the direction of rotation of the rotor.

10. In an autorotatable sustaining rotor for aircraft, having a generally upright hub and a sustaining blade mounted thereon for autorotative actuation at a positive mean pitch angle, mechanism articulating the sustaining blade to the hub including pivot means for lag-and-lead and pitch-varying motions of the blade providing a pitch-lag characteristic other than pronouncedly negative in normal flight operation, mechanism for applying a driving torque to the rotor for starting purposes, and means automatically acting upon driving of the rotor to hold said blade at a substantially reduced pitch angle during such driving.

11. In an autorotatable sustaining rotor for aircraft, having a generally upright hub and a sustaining blade mounted thereon for autorotative actuation at a positive mean pitch angle, mechanism articulating the sustaining blade to the hub including pivot means for lag-and-lead and pitch-varying motions of the blade providing a pitch-lag characteristic other than pronouncedly negative in normal flight operation, and mechanism for applying a driving torque to the rotor for starting purposes, at least one of said mechanisms incorporating means for retaining said blade at a substantially reduced pitch angle during the driving of the rotor.

12. In an autorotatable sustaining rotor for aircraft, having a generally upright hub and a sustaining blade mounted thereon for autorotative actuation at a positive mean pitch angle, mechanism articulating the sustaining blade to the hub including pivot means for lag-and-lead and pitch-varying motions of the blade providing a pitch-lag characteristic other than pronouncedly negative in normal flight operation, and mechanism for applying a driving torque to the rotor for starting purposes, said rotor driving mechanism including means for holding the blade at a substantially reduced pitch angle during the driving of the rotor.

13. In an autorotatable sustaining rotor for aircraft, having a generally upright hub and a sustaining blade mounted thereon for autorotative actuation at a positive mean pitch angle, mechanism articulating the sustaining blade to the hub including pivot means for lag-and-lead and pitch-varying motions of the blade providing a pitch-lag characteristic other than pronouncedly negative in normal flight operation, and mechanism for applying a driving torque to the rotor for starting purposes, said blade articulating mechanism incorporating means including interengaging parts acting to set up a moment about the pitch changing axis for holding the blade at a substantially reduced pitch angle during the driving of the rotor.

14. In an autorotatable sustaining rotor for aircraft, having a generally upright hub and a sustaining blade mounted thereon for autorotative actuation at a positive mean pitch angle, mechanism articulating the sustaining blade to the hub including pivot means for lag-and-lead and pitch-varying motions of the blade providing a pitch-lag characteristic other than pronouncedly negative in normal flight operation, mechanism for applying a driving torque to the rotor for starting purposes, and means including interengaging parts acting to set up a moment about the pitch-changing axis automatically operative upon driving of the rotor to hold said blade at a substantially reduced pitch angle and to release said blade for movement to a substantial positive angle upon cessation of operation of said driving mechanism.

15. An aircraft sustaining rotor including a hub, blades, articulating members connecting the blades to the hub for variation of blade pitch angle, a driving member adapted for connection to a source of power and mounted coaxially with the hub and rotatable relatively thereto, at least to a limited extent, and connections between said driving member and certain blade articulating members which are movable relatively to the hub whereby the driving force is applied to said members in a direction to move the blades on their articular mountings into a position of minimum blade angle.

16. An aircraft sustaining rotor including a hub, blades, articulating members connecting the blades to the hub for variation of blade pitch angle, a driving member adapted for connection to a source of power and mounted coaxially with the hub and rotatable relatively thereto, at least to a limited extent, and connections between said driving member and the blades themselves whereby the driving force is applied to the blades in such a way as to move the blades relatively to the hub on their articular mountings into a position of minimum blade angle and stop means determining said minimum angle.

17. An aircraft sustaining rotor including a hub, blades, articulating members connecting the blades to the hub for variation of blade pitch angle, a driving member adapted for connection to a source of power and mounted coaxially with the hub and rotatable relatively thereto, at least to a limited extent, and connections between said driving member and certain blade articulating members which are movable relatively to the hub whereby the driving force is applied to said members in a direction to move the blades on their articular mountings into a position of minimum blade angle, and stop means determining said minimum angle.

18. In an aircraft having a disconnectible rotor driving system, an autorotatable sustaining rotor comprising a generally upright hub, a sustaining blade mounted thereon for autorotative actuation at a positive mean pitch angle, and mechanism articulating the sustaining blade to the hub including a plurality of pivot devices at least one of which is arranged to provide pitch varying motions of the blade, said rotor being adapted for operation under a condition of free autorotation or alternatively under a condition of power drive, and means acting under the influence of the centrifugal force of rotation of the rotor blade to lock one of said pivot devices during one of said conditions of operation, the pivot device operative when the rotor is freely autorotating providing a pitch-lag characteristic other than pronouncedly negative.

19. In an aircraft having a disconnectible rotor driving system, an autorotatable sustaining rotor comprising a generally upright hub, a sustaining blade mounted thereon for autorotative actuation at a positive mean pitch angle, and mechanism articulating the sustaining blade to the hub including a plurality of pivot devices at least one of which is arranged to provide pitch varying motions of the blade, said rotor being adapted for operation under a condition of free autorotation or alternatively under a condition of power drive, and toggle mechanism acting under the influence of the centrifugal force of rotation of the rotor to lock one of said pivot devices during one of said conditions of operation, the pivot device operative when the rotor is freely autorotating providing a pitch-lag characteristic other than pronouncedly negative.

20. In an aircraft having a disconnectible rotor driving system, an autorotatable sustaining rotor comprising a generally upright hub, a sustaining blade mounted thereon for autorotative actuation at a positive mean pitch angle, and mechanism articulating the sustaining blade to the hub including a plurality of pivot devices at least one of which is arranged to provide pitch varying motions of the blade, said rotor being adapted for operation under a condition of free autorotation or alternatively under a condition of power drive, and toggle mechanism acting under the influence of the centrifugal force of rotation of the rotor to lock one of said pivot devices during one of said conditions of operation, the pivot device operative when the rotor is freely autorotating providing a pitch-lag characteristic other than pronouncedly negative, and lever means reacting between the blade and an element of said blade articulating mechanism to control the action of the toggle mechanism.

21. An aircraft sustaining rotor comprising a hub, blades having root members, articulating members connecting the blade root members to the hub for variation of blade pitch angle, a driving device adapted for connection to a source of power and mounted coaxially with the hub and rotatable relatively thereto, at least to a limited extent, and mechanism whereby the driving force is applied in such a way as to move the blades relatively to the hub on their articular mountings to a position of reduced pitch angle including lugs or the like engaging with certain of the aforementioned members.

22. An aircraft sustaining rotor comprising a hub, blades having root members, articulating members connecting the blade root members to the hub for variation of blade pitch angle, a driving device adapted for connection to a source of power and mounted coaxially with the hub and rotatable relatively thereto, at least to a limited extent, and mechanism whereby the driving force is applied in such a way as to move the blades relatively to the hub on their articular mountings to a position or reduced pitch angle, said mechanism comprising lugs or the like on the driving device and levers adapted to engage said lugs and certain of said members.

23. An aircraft sustaining rotor comprising a hub, blades having root members, articulating members connecting the blade root members to the hub for variation of blade pitch angle, a driving device adapted for connection to a source of power and mounted coaxially with the hub and rotatable relatively thereto, at least to a limited extent, and mechanism whereby the driving force is applied in such a way as to move the blades relatively to the hub on their articular mountings to a position of reduced pitch angle, said mechanism comprising lugs or the like on the driving device and levers adapted to engage said lugs and certain of said members, said levers being pivoted on the hub.

24. An aircraft sustaining rotor comprising a hub, blades having root members, articulating members connecting the blade root members to the hub for variation of blade pitch angle, a driving device adapted for connection to a source of power and mounted coaxially with the hub and rotatable relatively thereto, at least to a limited extent, and mechanism whereby the driving force is applied in such a way as to move the blades relatively to the hub on their articular mountings to a position of reduced pitch angle, said mechanism comprising lugs or the like on the driving device and levers adapted to engage said lugs and certain of said members, said levers being pivoted on the movable articulating members.

25. An aircraft sustaining rotor including a hub, blades, articulating members connecting the blades to the hub for variation of blade pitch angle, a driving member adapted for connection to a source of power and mounted coaxially with the hub and rotatable relatively thereto, at least to a limited extent, and a series of driving connections between said driving member and the blades whereby the driving force is applied to the blades in a direction to move the blades on their articular mountings in to a position of substantially reduced pitch angle, and braking mechanism for the rotor adapted to operate through such part of the driving connections that the braking force also acts on the blades to move them on their articular mountings to a position of substantially reduced pitch angle.

26. In an aircraft, disconnectible rotor driving mechanism, an autorotatable sustaining rotor having a generally upright hub and a sustaining blade mounted thereon for autorotative actuation at a positive mean pitch angle, mechanism articulating the sustaining blade to the hub including pivot means providing a blade pivot axis inclined upwardly and inwardly with respect to the longitudinal axis of the blade, means for holding said blade in a leading position with reference to said pivot axis automatically by operation of the rotor driving mechanism, and a stop device limiting the said leading displacement of the blade.

27. In an aircraft, disconnectible rotor driving mechanism, an autorotatable sustaining rotor having a generally upright hub and a sustaining blade mounted thereon for autorotative actuation at a positive mean pitch angle, mechanism articulating the sustaining blade to the hub including pivot means providing a blade pivot axis inclined upwardly and inwardly with respect to the longitudinal axis of the blade about which the blade may swing in a leading direction with decrease of pitch and another pivot means positioned to provide substantially pure leading and lagging movement of the blade, and means for holding said blade in a leading position about said first named pivot axis during the operation of the rotor driving mechanism.

28. In an aircraft, disconnectible rotor driving mechanism, an autorotatable sustaining rotor having a generally upright hub and a sustaining blade mounted thereon for autorotative actuation at a positive mean pitch angle, mechanism articulating the sustaining blade to the hub including pivot means providing a blade pivot axis inclined upwardly and inwardly with respect to the longitudinal axis of the blade and a second pivot means providing a blade pivot axis about which substantially pure leading and lagging movement of the blade takes place, the said second pivot axis articulating the blade to the said first mentioned pivot axis in such position that upon application of the rotor driving torque the blade lags about the second pivot axis to relieve bending stresses and the second pivot axis takes a leading position about said first pivot axis to reduce the blade pitch.

29. In an aircraft, disconnectible rotor driving mechanism, an autorotatable sustaining rotor having a generally upright hub and a sustaining blade mounted thereon for autorotative actuation at a positive mean pitch angle, mechanism articulating the sustaining blade to the hub including pivot means providing a blade pivot axis inclined upwardly and inwardly with respect to the longitudinal axis of the blade, and a second pivot means providing a blade pivot axis about which substantially pure leading and lagging movement of the blade takes place, the said second pivot axis articulating the blade to the said first mentioned pivot axis by an intermediate member, and means forming part of the driving mechanism adapted to bear on said intermediate member.

30. An aircraft sustaining rotor including a hub, blades, articulating members connecting the blades to the hub including means providing for variation of blade pitch angle, a driving member adapted for connection to a source of power and mounted coaxially with the hub and rotatable relatively thereto, at least to a limited extent, and connections between said driving member and the blades themselves for transmitting the rotor driving force to the blades in such a way as to move the blades relatively to the hub on their articular mountings to vary the blade pitch angle, and said articulating members further including pivot means operative to provide freedom for swinging movement of the blades generally transverse the rotative path of travel thereof regardless of whether a driving force is being transmitted to the blades from said connections.

31. In an aircraft having a bladed sustaining rotor, a rotative hub, pivotal connections for mounting the rotor blades on the hub, the pivotal connections including means providing freedom for rotational movement of the blades about radial axes to provide for change of blade pitch angle, a driving element for the rotor, and members for transmitting the rotor driving force from the driving element to pivotal blade connection parts, the driving element being mounted on the hub with freedom for relative rotational movement with respect thereto, the driving element and driving members cooperating to effect change of blade pitch upon relative movement of the driving element with respect to the hub, the pivotal connections further including pivot means operative to provide freedom for swinging movement of the blades generally transverse their rotative path of travel regardless of whether a driving force is being transmitted from said driving members to said pivotal blade connection parts.

32. In an aircraft having a bladed sustaining rotor, a rotative hub, pivotal connections for mounting the rotor blades on the hub, the pivotal connections providing freedom for rotational movement of the blades about radial axes to provide for change of blade pitch angle, a driving element for the rotor, members for transmitting driving force from the driving element to pivotal blade connection parts, the driving element being mounted on the hub with freedom for relative rotational movement with respect thereto, the driving element and driving members cooperating to effect change of blade pitch upon relative movement of the driving element with respect to the hub, and means for predeterminedly limiting the degree of blade pitch change upon driving the rotor through said driving element, the pivotal connections further including pivot means operative to provide freedom for swinging movement of the blades generally transverse their rotative path of travel regardless of whether a driving force is being transmitted from said driving members to said pivotal blade connection parts.

33. In an aircraft sustaining rotor including a hub, blades, articulating members connecting the blades to the hub for conjoint lag-and-lead and pitch-change movements of the blades, a driving member adapted for connection to a source of power and mounted coaxially with the hub and rotatable relatively thereto, at least to a limited extent, and connections between said driving member and certain blade connecting members which are movable relatively to the hub whereby the driving force is applied to said members in a direction to move the blades on their articular mountings into a position of reduced blade pitch angle.

34. In an aircraft sustaining rotor including a hub, blades, articulating members connecting the blades to the hub including for each blade an oblique pivot providing for conjoint lag-and-lead and pitch-change movements thereof, a driving member adapted for connection to a source of power and mounted coaxially with the hub and rotatable relatively thereto, at least to a limited extent, and connections between said driving member and certain blade connecting members which are movable relatively to the hub whereby the driving force is applied to said members in a direction to move the blades on their articular mountings into a position of reduced blade pitch angle.

35. An aircraft sustaining rotor including a hub, a blade, and mounting mechanism for connecting the blade with the hub incorporating a toggle device adapted, under different operating conditions, to be maintained by the centrifugal force of rotation alternatively in a plurality of positions which provide different rotor characteristics.

36. An aircraft sustaining rotor including a hub, a blade connected thereto and a toggle device forming part of the blade connection to the hub and adapted under the influence of the centrifugal force of rotation of the blade to alter the rotor characteristics.

37. An aircraft sustaining rotor including a hub, a blade connected thereto and a toggle device forming part of the blade connection to the hub and adapted under the influence of the centrifugal force of rotation of the blade to alter the rotor characteristics, and means for applying driving torque to the blade through said toggle device to control the action of the latter.

38. An aircraft sustaining rotor including a hub, a blade connected thereto and a torque-controlled centrifugally-locked toggle device forming part of the blade connection to the hub and positioned to alter the effective blade pitch.

39. An aircraft sustaining rotor including a hub, a blade, mounting mechanism for connecting the blade with the hub incorporating a toggle device having at least two positions in one of which the blade pitch angle is higher than in the other, and mechanism for applying a driving torque to the rotor, the toggle device being movable between said two positions under the influence of relative variation in the action of centrifugal force on the blade and in the rotor driving torque condition and providing for movement to one of said toggle positions upon application of a substantial driving torque and for movement to the other of said toggle positions under the influence of centrifugal force upon substantial cessation of the driving torque.

40. An aircraft sustaining rotor including a hub, a blade, mounting mechanism for connecting the blade with the hub incorporating a toggle device having different positions in one of which the blade pitch is higher than in the other, the toggle device comprising toggle members relatively movable in either direction beyond a position of dead center, stop devices limiting movement of said toggle members in either direction to define two predetermined blade pitch positions, and mechanism for applying a driving torque to the rotor, the toggle members being movable between said two positions under the influence of relative variation in the action of centrifugal force on the blade and in the rotor driving torque condition and providing for movement to one of said toggle positions upon application of a substantial driving torque and for movement to the other of said toggle positions under the influence of centrifugal force upon substantial cessation of the driving torque.

JOHN JOSSELYN,
R. BLAKE,
Administrators of the Estate of Juan de la Cierva, Deceased.

CERTIFICATE OF CORRECTION.

Patent No. 2,216,768.
October 8, 1940.

JUAN de la CIERVA, deceased, by
JOHN JOSSELYN and REGINALD BLAKE, ADMINISTRATORS.

It is hereby certified that error appears in the printed specification of the above numbered patent requiring correction as follows: Page 6, second column, line 37, for "link 7" read --link 47--; page 7, first column, line 61, for the word "means" read --mean--; and second column, line 16, for the words "is claimed" read --we claim--; page 9, second column, line 42, claim 22, for "or" read --of--; page 10, first column, line 11, claim 25, for "in to" read --into--; and second column, line 50, claim 32, after "connections" insert --including means--; line 53, same claim, after "transmitting" insert --the rotor--; and that the said Letters Patent should be read with this correction therein that the same may conform to the record of the case in the Patent Office.

Signed and sealed this 10th day of December, A. D. 1940.

(Seal)

Henry Van Arsdale,
Acting Commissioner of Patents.